United States Patent Office 3,232,957
Patented Feb. 1, 1966

3,232,957
PROCESS FOR THE PREPARATION OF
OLEFIN OXIDES
Dexter B. Sharp, Creve Coeur, Mo., assignor to Monsanto Company, a corporation of Delaware
No Drawing. Filed Nov. 18, 1963, Ser. No. 324,192
11 Claims. (Cl. 260—348.5)

This invention is directed to a new and improved process for the preparation of olefin oxides. It is further directed to an improved solvent for use as an oxidation medium for the preparation of olefin oxides by the action of molecular oxygen upon olefins.

Still more particularly this invention relates to a process for the direct epoxidation of olefins with molecular oxygen in a solvent comprising certain ketones as defined more fully hereinafter.

Olefin oxides are extremely useful articles of commerce. They are used as starting materials for the preparation of anti-freeze compositions, humectants, pharmaceutical preparations, cosmetic formulations, as monomers for the preparation of polymers useful in preparing polyurethanes, and the like. Notable among these epoxides are ethylene oxide and propylene oxide. Currently these are prepared by a vapor phase catalytic method and by the classic two-step chlorohydrin route, respectively. The vapor phase process insofar as industrial production of epoxides is concerned, is apparently confined to the preparation of ethylene oxide. Higher olefins have yet to be used in a vapor phase catalytic process to give economic production of the corresponding oxides. The older chlorohydrin route is the principal industral process which supplies the largest quantities of propylene oxide for commerce. This process is suitable for conversion of ethylene and propylene to their corresponding epoxides, but higher olefins are not particularly adaptable to the chlorohydrin route.

Still a third process for the preparation of olefin oxides is that involving peracetic acid oxidation of olefins to the corresponding oxides. This process appears to have wider application insofar as olefin structure is concerned than do the first two methods mentioned. It apparently proceeds by an ionic mechanism, and the rate of epoxidation using peracetic acid is characteristic of the structure of the olefin. Highly substituted ethylenes, for example, tetramethylethylene and trimethylethylene, react smoothly and rapidly with peracetic acid to give the corresponding epoxides. However, ethylenic compounds having much lower degrees of substitution about the ethylene group, for example, ethylene and propylene, by virtue of the ionic nature of the reaction, react sluggishly with peracetic acid and the rate of formation of the corresponding epoxides is very slow.

Nevertheless, each of these aforementioned processes has inherent disadvantages. For example, vapor phase catalytic oxidation of ethylene to ethylene oxide requires large volume equipment and the handling of tremendous quantities of potentially explosive mixtures of ethylene and oxygen. The second process, that is, the chlorohydrin route, for propylene oxide essentially involves a two-step process; in addition, chlorinated by-products arise in this process. The third process, involving peracetic acid oxidation of olefins, is potentially hazardous if relatively large quantities of peracetic acid are to be used. It is noted, however, that the peracetic acid process is probably the most versatile of the three methods; it is applicable to a far greater range of olefin structures than is the vapor phase catalytic process or the chlorohydrin process.

There are scattered references to still a fourth method of preparing olefin oxides, namely the liquid phase oxidation of olefins with molecular oxygen. Several of these are restrictive in the sense that specific limitations are incorporated in each method. For example, catalysts or other additives or secondary treatment of the oxidation mixtures with basic materials are essential features of these methods.

Since the present invention is concerned with a novel liquid phase epoxidation system, the discussion below will be directed to typical existing prior art schemes for liquid phase olefin oxidations. These prior art processes describe a variety of approaches to a proper balancing of a series of reaction variables in order to obtain the desired olefin oxide. For example, various specific oxidation catalysts, catalyst-solvent, or catalyst-promoter-solvent systems have been described (U.S. Patents 2,741,623, 2,837,424, 2,974,161, 2,985,668 and 3,071,601); another approach is the incorporation of oxidation anticatalysts which retard certain undesirable side reactions (U.S. Patent 2,279,470); still another approach emphasizes the use of water-immisible hydrocarbon solvents alone, or in the presence of polymerization inhibitors such as nitrobenzene (U.S. Patent 2,780,635), or saturated hydrocarbons (U.S. Patent 2,780,634); another method describes the use of neutralizers such as alkali metal and alkaline earth metal hydroxides, or salts of these metals (U.S. Patent 2,838,524); another approach involves the use of certain catalysts in an alkaline phase (U.S. Patent 2,366,-724), or a liquid phase maintained at specified critical pH values (U.S. Patent 2,650,927); and still other approaches emphasize criticality of oxygen pressure (U.S. Patent 2,879,276), or the geometry of the reaction zone (U.S. Patents 2,530,509 and 2,977,374). The foregoing represent prior art approaches to problems encountered in the utilization of a liquid phase oxidation process to obtain olefin oxides.

It is the primary object of the instant invention to provide a superior process for commercial production of olefin oxides which process is free of numerous limitations recited in prior art processes.

A further object of this invention is to provide a liquid phase process for the production of olefin oxides which is not dependent upon the presence or absence of any catalyst; nor dependent upon solvents containing added buffers or acid neutralizers or other additives or secondary treatments with alkaline materials to remove acidic components; nor is it dependent upon the presence of saturated compounds, initiators, promoters, or anticatalysts; further it is not dependent upon critical reactor geometries, temperatures, pressures, pH level, oxygen concentration flow rates, or reactant ratios.

It is a further object of this invention to provide a new class of solvents for direct epoxidation of olefins with molecular oxygen.

It is an additional object of this invention to provide a new process which is applicable to a wide range of olefin structures; that is, it is not limited to a single olefin or two, but rather, has a broad application over a large class of unsaturated compounds.

It is an additional object of this invention to provide a new process which requires relatively small scale equipment and does not involve the hazards associated with certain of the prior art processes, e.g., the vapor phase process.

Other objects of this invention are to provide a process for the production of olefin oxides in batch or continuous manner by a method which is simple, safe, economical and dependable.

These and other objects of the invention will become apparent to those skilled in the art as description of the invention herein proceeds.

According to the present invention, it has been discovered that olefinically unsaturated compounds containing an epoxidizable ethylenic group can be oxidized to epoxides with molecular oxygen in high conversions and yields when the oxidation is allowed to proceed in a liquid reaction medium comprising at least one ketone selected from the group of ketones having the following general formula:

wherein R represents unsubstituted cycloalkyl or halocycloalkyl groups having from 3 to 6 carbon atoms and unsubstituted monocyclic or polycyclic aryl groups having up to 12 carbon atoms; and $R^1$ represents radicals selected from the group represented by R and unsubstituted alkyl groups having from 1 to 18 carbon atoms.

Representative ketones within the formula shown above which are suitable herein include symmetrical diaryl ketones such as benzophenone, di-biphenylyl ketone and di-1-naphthyl ketone; unsymmetrical di-aryl ketones such as phenyl biphenylyl ketone, phenyl naphthyl ketone, and biphenylyl naphthyl ketone; unsymmetrical alkyl-aryl and cycloalkyl-aryl ketones such as acetophenone, acetylbiphenyl, acetonaphthone, n-propyl phenyl ketone, isopropyl biphenyl ketone, 1,1-dimethyl ethyl phenyl ketone, tertiary-butyl phenyl ketone, octyl phenyl ketone, nonyl phenyl ketone, dodecyl biphenyl ketone, octadecyl phenyl ketone, cyclobutyl naphthyl ketone, cyclopentyl phenyl ketone, cyclohexyl phenyl ketone, cyclohexyl biphenylyl ketone and cyclohexyl naphthyl ketone, and symmetrical and unsymmetrical dicycloalkyl ketones such as di-cyclopropyl ketone, dicyclobutyl ketone, dicyclopentyl ketone, dicyclohexyl ketone, cyclobutyl cyclopropyl ketone, cyclobutyl cyclohexyl ketone and cyclohexyl cyclopropyl ketone.

Halogenated analogs of the foregoing ketones include the monohalo-, dihalo-, trihalo- and tetrahalo-analogs thereof. Suitably, fluorine, chlorine or bromine may be attached to the hydrocarbon ring at any position relative to the keto group in the ketone. Examples of halogenated ketones useful herein include 1,1-dimethyltrichloroethyl phenyl ketone, 1,1-dimethyl-3-fluorobutyl phenyl ketone, 2,2,2-trichloroethyl naphthyl ketone, 2-bromoethyl biphenylyl ketone, 2,3-dichloropropyl phenyl ketone, 1,2,3,4-tetrachlorophenyl methyl ketone, di-(o-dichlorophenyl) ketone, di-(1-bromo-1-cyclobutyl) ketone, di-(1,2-dichloro-1-cyclohexyl) ketone, 1-bromonaphthyl isopropyl ketone, 2-fluorocyclohexyl phenyl ketone, and 8,8,8-trichlorooctyl naphthyl ketone.

These ketones may be used individually or in mixtures thereof. For example, a mixture of varying proportions, typically a 1:1 wt. percent combination, of acetophenone and octyl phenyl ketone is suitable, or mixtures of benzophenone and dinaphthyl ketone.

The ketone solvents described herein are readily prepared by conventional ketone preparations. For example, by the Grignard reaction, aliphatic nitriles, amides and anhydrides form addition products with Grignard reagents which are hydrolyzed with dilute hydrochloric acid to ketones, e.g.,

Another ketone preparation involves the reaction of acid chlorides with zinc alkyls to form an intermediate which reacts with a second molecule of the acid chloride to form the ketone and zinc chloride, e.g.,

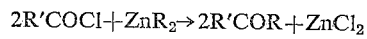

Still another method for preparing ketones as used herein includes the Friedel-Crafts synthesis. This reaction usually involves the condensation of an aromatic or aliphatic acid halide with an aromatic hydrocarbon in the presence of anhydrous aluminum chloride, e.g.,

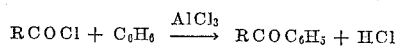

The solvents herein combine essential characteristics and features required for successful liquid phase oxidation, that is, they are high boiling, essentially chemically indifferent and are oxidatively and thermally stable. Furthermore, the instant solvents are superior to those disclosed in prior art liquid phase olefin oxidation processes in that they do not require buffers, neutralizers, initiators, promoters, polymerization or oxidation inhibitors, and/or catalysts in order to utilize the above-mentioned essentials to effect oxidation of the olefin to the olefin oxide in high yield and conversion. Solvents or prior art processes in general require one or more of the above additives in order to promote the oxidation of the olefin and combat the deleterious effects of by-products such as acidic components.

It is known that olefin oxidations give, in addition to epoxides, various by-products such as water, formic acid and acetic acid which can be deleterious to the oxidation when present in appreciable quantities by reacting with the olefin oxide to give corresponding glycol and glycol derivatives as well as undesired polymeric materials. Prior art methods have used a variety of approaches to counteract these deleterious effects, such as the use of water-immiscible hydrocarbon solvents containing inhibitors, neutralizers or utilized in conjunction with a separate washing step with solutions of basic substances, in effect, processes which require acid removal in order for such water-immiscible hydrocarbon solvents to be used for the olefin oxidation. One way to remove the reactive acids from the reaction mixture is by salt formation, that is, by addition of an organic or inorganic base. However, these basic compounds are known to inhibit primary oxidation reaction and therefore cannot suitably be used. The formation of salts likewise presents additional mechanical problems due to a build-up thereof in the reactor and salt removal systems must be resorted to.

It is a primary feature of the instant invention that the described ketone solvents of this invention need no added substances to counteract the deleterious effect of water and acids. Since the solvents used herein for the olefin oxidation are water-immiscible water and water-soluble acids formed in the reaction are removed as a separate layer from the ketone solvent containing the olefin oxide. Moreover, by use of the instant solvents a surprisingly substantial quantity of water and organic acids can be tolerated without undue adverse effects upon the course of the olefin epoxidation.

It is a further feature of the instant invention that the olefin oxidations proceed at such a rapid rate that the oxygen is quantitatively consumed, hence, accumulation of potentially hazardous explosive mixtures of oxygen and organic materials in the vapor state are avoided.

It is further apparent that there is no criticality insofar as pH value is concerned for this oxidation since appreciable concentrations of acid by-products, for example, up to 20 weight percent of acetic acid is not particularly deleterious. Hence, the olefin oxidation in the present solvents proceeds suitably over a range of pH's as low as pH 4 and in neutral and alkaline pH ranges.

Substantial evidence exists that these olefin oxidations, for example, propylene to propylene oxide by direct oxidation with molecular oxygen, are propagated by a free radical chain mechanism. Copper and its compounds are strong inhibitors for this propylene oxidation; an inhibition probably due to a redox reaction of copper with peroxy radicals which interrupts the chain propagation sequence and prevents attainment of a long kinetic chain necessary for reasonable conversion of the olefin. In addition, when free radical inhibitors, that is, antioxidants, are added to the reaction mixture, partial or complete inhibition of the olefin oxidation occurs. In the absence of such inhibitors a very rapid, vigorous exothermic oxidation of the olefin occurs in the solvent. Furthermore, the present solvents are apparently very resistant to free radical attack and are recovered substantially unchanged. On the contrary, among prior art solvents benzene is an example of a compound which is readily attacked by free radicals. Such a benzene radical can react with oxygen to give phenolic or quinonoid-type molecules which are known to be efficient inhibitors for radical chain oxidations. Thus, when benzene is used as a solvent for an olefin oxidation its susceptibility to free radical attack gives rise to an effect which might be termed autoinhibition, that is, the rate of oxidation of the olefin decreases with time. In comparison, the present ketone solvents have a high order of resistance to radical attack and do not impede the radical chain sequence and the rate of oxidation of the olefin is not effected; the olefin oxidation proceeds to the depletion of either the olefin or the oxygen.

The ketone solvents of the instant invention constitute a suitable reaction medium for substantially all olefin oxidations with molecular oxygen to form olefin oxides. The term "molecular oxygen" as used herein includes pure or impure oxygen as well as gases containing free oxygen, for example, air.

Olefins suitable for use herein preferably include those of the ethylenic and cycloethylenic series up to 18 carbon atoms per molecule, e.g., ethylene, propylene, butenes, pentenes, hexenes, heptenes, octenes, nonenes, dodecenes, pentadecenes, heptadecenes, octadecenes, cyclobutene, cyclopentene, cyclohexene, cyclooctene, etc. Of particular interest, utility and convenience are the olefins containing from 2 to 8 carbon atoms. Included are the alkyl-substituted olefins such as 2-methyl-1-butene, 2-methyl-2-butene, 4-methyl-2-pentene, 2-ethyl-3-methyl-1-butene, 2,3-dimethyl-2-butene and 2-methyl-2-pentene. Other suitable olefinic compounds include isobutylene, conjugated and unconjugated dienes including the butadienes, e.g., 1,3-butadiene, isoprene, other pentadienes, hexadienes, heptadienes, octadienes, decadienes, dodecadienes, octadecadienes; cyclopentenes, cyclohexenes; aryl-substituted cycloalkenes and cycloalkadienes such as 1-phenyl-1-cyclohexene, 3-(1-naphthyl)-1-cyclopentene, 1-(1-biphenylyl)-1,3-cyclohexadiene; vinyl-substituted cycloalkenes, such as 4-vinyl-1-cyclohexene, 4-vinyl-1,4-dimethyl-1-cyclohexene; vinyl-substituted benzenes, such as 4-methylstyrene, 4-phenylstyrene, 1,4-divinylbenzene; cyclopentadiene; dicyclopentadiene; alkyl-substituted cycloalkenes and cycloalkadienes; styrene, α-methylstyrene, methylstyrenes; unsaturated macromolecules, such as homopolymers of butadiene and isoprene and copolymers thereof, e.g., polybutadiene, natural rubber, butadiene/styrene copolymers, butyl rubber, butadiene/acrylonitrile copolymers, and the like.

Particularly suitable olefin feed stocks contemplated in the instant invention are the pure olefin or mixtures thereof, or olefin stocks containing as much as 50% or more of saturated compounds. Olefinic feed materials include those formed by cracking petroleum stock such as hydrocarbon oils, paraffin wax, lubricating oil stocks, gas oils, kerosenes, naphthas and the like.

The reaction temperatures used in liquid phase olefin oxidations using the solvents of the instant invention are subject only to a lower limit below which the oxidation either proceeds too slowly or follows a course other than that leading to olefin oxides. The upper limit of the temperature range is that which may be termed a threshold above which substantial decomposition, polymerization or excessive oxidative side reactions occur, thereby leading to undesirable side reactions and products which substantially detract from the yield of the olefin oxide. In general, temperatures of the order of 50° C. to 400° C. are contemplated. It is expedient to maintain temperatures at a sufficiently high level to insure thermal decomposition of hazardous peroxides which may be formed and accumulated to the point of unsafe operation. Within this general temperature range preferred temperatures are within the range of 140–250° C.

Subatmospheric, atmospheric or superatmospheric pressures are suitable for use in the instant invention, that is, ranging from 0.5 to 150 atmospheres. Usually the oxidation reaction is facilitated by the use of higher pressures, hence a preferred pressure range is from 10 to 100 atmospheres. Pressures herein delineated and temperatures described previously will generally be selected, of course, depending upon the characteristics of the individual olefin which is to be oxidized to the olefin oxide, but this combination of temperatures and pressures will be such as to maintain a liquid phase. Olefin oxidations in the instant solvents are autocatalytic, that is, they proceed by free radical chain reaction mechanisms, and the reactions proceed very rapidly after a brief induction period and give remarkably controllable product composition over wide variations of conditions. A typical olefin oxidation, for example, propylene in batch operation, requires from about 1 to 20 minutes. Similar, or faster, reaction rates occur in continuous operation. The reaction vessel for conducting this olefin oxidation can be made of materials which may include almost any kind of ceramic material, porcelain, glass, silica, various metals, such as aluminum, silver and nickel and various stainless steels such as Hastelloy C. The reaction vessel does not necessarily have to conform to any particular geometric design. It should be noted in the instant invention that no added catalysts are necessary and no reliance is placed upon catalytic activity of the walls of the reactor or reactor components.

Various means known to the art can be utilized for establishing intimate contact to the reactants, i.e., olefin and molecular oxygen in the solvent, for example, by stirring, sparging, shaking, vibration, spraying or other various agitation in the reaction mixture. The vigorous agitation of the reaction mixture effects not only intimate contact of olefin and oxygen, but also facilitates removal of the heat of reaction to suitably oriented heat exchangers. It is to be noted, also, that the exothermic nature of the olefin oxidation is such that very small or negligible amounts of heat need be applied to the reaction system in order to maintain the desired temperature of operation, hence, reaction temperature is adequately maintained by suitable design and proper use of heat exchange components.

As noted above, no added catalysts are required to the present invention. The usual oxidation catalysts can be tolerated although usually no significant benefit accrues from their use because the olefin oxidations proceed in such facile manner in the solvents of the instant invention. Oxidation catalysts such as platinum, selenium, vanadium, iron, nickel, cerium, chromium, manganese, silver, cobalt, cadmium and mercury in metallic or compound form, preferably as oxide or carbonate or as soluble acetates or carboxylates may be present singly or mixed in gross form, supported or unsupported, or as finely-divided suspensions or in solutions in the solvent.

It should also be noted that since olefin oxidations according to this invention proceed at such a rapid rate after a brief induction period no initiators, accelerators, or promoters are required, but these may be used to shorten or eliminate the brief induction period after which no additional initiator, promoter or accelerator need be added. Suitable initiators, accelerators or promoters include organic peroxides such as benzoyl peroxide, tertiary-butyl hydroperoxide, di-tertiary-butyl peroxide; inorganic peroxides such as hydrogen and sodium peroxides; organic peracids such as peracetic and perbenzoic acid or various other peroxidic derivatives such as hydrogen peroxide and the hydroperoxide addition products of ketones and aldehydes. Also useful as initiators, promoters, or accelerators for the purpose of reducing the time of the induction period, but following which induction period no more need be added are readily oxidizable materials such as aldehydes, such as acetaldehyde, propionaldehyde, isobutyraldehyde and the like and ethers such as diethyl ether, diisopropyl ether, and the like.

The reaction mixtures to be used in carrying out the process of the instant invention may be made up in a variety of ways. Exemplary combinations are the olefin and/or oxygen premixed with the solvent, the olefin premixed with the solvent, suitably up to 50% by weight based on the solvent and, preferably, from 10% to 45% by weight based on the solvent, and the oxygen added thereto. The oxygen-containing gas may be introduced into the olefin-solvent mixture incrementally or continuously. Or, the reactor may be charged with solvent and the olefin and oxygen gas may be introduced simultaneously through separate feed lines into the body of the pure ketone solvent in a suitable reaction vessel. In one embodiment the olefin and oxygen-containing gas mixture is introduced into the pure solvent in a continuously stirred reactor, under the conditions of temperatures and pressures selected for this particular olefin. Suitable olefin to oxygen volumetric ratios are within the range of 1 to 5 up to 15 to 1. Feed rates, generally, of oxygen or oxygen-containing gas may vary from 0.5 to 1500 cubic feet per hour or higher and will largely depend upon reactor size within production quantity desired. The oxygen input is adjusted in such manner as to allow virtually complete usage of oxygen, thereby keeping the oxygen concentration in the off-gas above the reaction mixture below about 1%. This safeguard is necessary in order to prevent a hazardous concentration of explosive gases. Oxygen, or air, feed rates should be adjusted so that the olefin not be stripped from the liquid phase, thereby reducing the concentration of olefin, hence, rate of oxidation of the olefin, thus giving lower conversions per unit time.

In the preferred mode of operation the ketone solvents herein constitute the major proportion of the liquid reaction medium with respect to all other constituents including reactants, oxidation products and co-products dissolved therein. By major is meant that enough solvent is always present to exceed the combined weight of all other constituents. However, it is within the purview of this invention, although a less preferred embodiment, to operate in such manner that the combined weight of all components in the liquid phase other than the ketones exceeds that of the ketone solvent. For example, a refinery grade hydrocarbon feed-stock or a crude hydrocarbon feedstock containing, e.g., 50% by weight of the olefin to be oxidized, e.g., propylene, and 50% by weight of saturated hydrocarbons, e.g., an alkane such as propane, may be used in quantities up to 50% by weight based on the solvent. Upon oxidizing this feedstock, unreacted olefin, alkane and oxygen together with oxidation products including the olefin oxide, intermediates such as acetone and methyl acetate, and high boilers (components having boiling points higher than that of the ketone solvent) formed in the reaction and/or recycled to the reactor may constitute as much as 75% by weight of the liquid reaction medium, according to reaction conditions or recycle conditions.

When carrying out the invention according to the less preferred mode of operation, the quantity of ketone solvent present in the liquid reaction medium should be not less than 25% by weight of said medium in order to advantageously utilize the aforementioned benefits characteristic to these unique olefin oxidation solvents.

In further embodiments of the present invention for oxidizing olefins with molecular oxygen in the liquid phase, the ketone solvents are suitably used in combination with diluents or auxiliary solvents which are relatively chemically indifferent, oxidatively and thermally stable under reaction conditions. Here, too, the ketone solvents should be utilized in quantities not less than 25% by weight of the liquid reaction medium in order to retain the superior benefits of these solvents in liquid phase olefin oxidations.

Suitable diluents which may be utilized with the ketone solvents of this invention include, e.g., hydrocarbon solvents such as benzene, cyclohexane, toluene, xylenes, kerosene, biphenyl and the like; halogenated benzenes such as chlorobenzenes, e.g., chlorobenzene and the like; dicarboxylic acid esters such as dialkyl phthalates, oxalates, malonates, succinates, adipates, sebacates, e.g., dibutyl phthalate, dimethyl succinate, dimethyl adipate, dimethyl sebacate, dimethyl oxalate, dimethyl malonate and the like; aromatic ethers such as diaryl ethers, e.g., diphenyl ether; halogenated aryl ethers such as 4,4'-dichlorodiphenyl ether and the like; dialkyl and diaryl sulfoxides, e.g., dimethyl sulfoxide and diphenyl sulfoxide; dialkyl and diaryl sulfones, e.g., dimethyl sulfone and dixylyl sulfone; chloroform, carbon tetrachloride and nitroalkanes, e.g., nitromethane. While the foregoing have been cited as typical diluents which may be used in combination with the solvents of this invention, it is to be understood that these are not the only diluents which can be used. In fact, the benefits accruing from the use of the ketones herein can be utilized advantageously when substantially any relatively chemically indifferent diluent is combined therewith.

Therefore, the present invention in its broadest use comprehends the oxidation of olefin-containing feedstocks in a liquid reaction medium consisting essentially of at least 25% by weight based on said medium of at least one ketone as described above.

In any case, the liquid reaction medium referred to herein is defined as that portion of the total reactor content which is in the liquid phase.

The oxidation products are removed from the reactor as a combined liquid and gaseous effluent containing the olefin oxide and unreacted components, by properly adjusting the conditions of temperature and pressure, or the reaction mixture containing the oxidation products is removed from the reactor and the olefin oxide separated. Conventional techniques for the separation of olefin oxides from olefin oxidation products include distillation, fractionation, extraction, crystallization and the like. One procedure comprises continually removing the liquid effluent from the reaction zone to a distillation column and removing the lower boiling components, including olefin oxide, overhead, separating the olefin oxide from this overhead fraction, and removing the bottoms from the initial distillation, comprising essentially the ketone solvent and recycling to the reaction zone.

The following examples illustrate specific embodiments of the present invention:

A modified cylindrical Hoke high-pressure vessel was employed for the batch-type oxidations described below. A high pressure fitting was welded to the vessel near one end to serve as gas inlet, and a block valve with rupture disc was attached to this fitting with a ¼ inch high-pressure tubing "goose-neck." A thermocouple was sealed into one end-opening of the vessel. The solvent and additives (if any) are then charged through the other end-opening which is then sealed with a plug. The olefin is then charged under pressure to the desired amount, as determined by weight difference, and the charged vessel affixed to a bracket attached to a motor-driven eccentric which provides vibrational agitation. The vibrating reaction vessel can be immersed in a hot bath for heating to reaction temperatures and quenched in a cold bath.

*Example 1*

To a Hoke pressure vessel of 150-ml. capacity was charged 26.06 g. of acetophenone as solvent, approximately 0.16 g. of acetaldehyde initiator and 5.98 g. of propylene. The sealed vessel was mounted on an agitator assembly and immersed in a polyethylene glycol bath maintained at 200° C. When thermal equilibrium was reached, oxygen was admitted to the vessel at 400 p.s.i.g. pressure, then after 2 minutes from the start an additional 100 p.s.i.g. oxygen was added; total overpressure with respect to autogeneous pressure developed at 200° C. in the vessel was 300 p.s.i.g. A maximum temperature of 230° C. was reached during oxidation which started immediately upon introduction of the oxygen. The oxidation was allowed to proceed for a total of seventeen minutes, then the oxygen was shut off, and the vessel was immersed in a cold water bath.

Vapor phase chromatographic analyses of gaseous and liquid phases showed a propylene conversion of 33.5% and a mole percent propylene oxide yield of 55.6%; the latter calculated against the quantity of propylene consumed.

Example 2

To a Hoke pressure vessel is charged isobutyrylbiphenyl, 0.17 g. of acetaldehyde, and 2,3-dimethyl-2-butene. The sealed vessel is attached to an agitator assembly and immersed in a bath maintained at 120° C., and when thermal equilibrium is reached, oxygen is introduced to give a total pressure of 150 p.s.i.g. Oxidation begins immediately and is allowed to proceed for five minutes, at which time the oxygen is shut off and the vessel is immersed in a cold water bath. Analyses indicate 60% conversion of 2,3-dimethyl-2-butene to oxygenated products, among which 2,3-dimethyl-2,3-epoxybutane is obtained in 65% yield.

Example 3

To a Hoke pressure vessel is charged acetonaphthone, 0.17 g. of acetaldehyde, and 2-methyl-2-butene. The sealed vessel is attached to an agitator assembly and immersed in a polyethylene glycol bath maintained at 150° C. When thermal equilibrium is reached, oxygen is introduced to a total pressure of 300 p.s.i.g., whereupon oxidation commences immediately. The oxidation is allowed to proceed for five minutes, then the oxygen is shut off and the vessel is immersed in a cold water bath. Analyses indicate a 53% conversion of 2-methyl-2-butene to oxygenated products, among which 2-methyl-2,3-epoxybutane is obtained in 49% yield.

Example 4

To a Hoke pressure vessel is charged stearophenone, 0.17 g. of acetaldehyde, and a branched dodecene of the type known to the art as propylene tetramer or tetrapropylene. The sealed vessel is attached to an agitator assembly and immersed in a polyethylene glycol bath maintained at 160° C. Oxygen is introduced to a total pressure of 300 p.s.i.g., whereupon oxidation commences immediately. The oxidation is allowed to proceed for ten minutes, then the oxygen is shut off and the vessel is immersed in a cold water bath. Analyses indicate 63% conversion of the branched dodecene to oxygenated products, among which epoxydodecane is obtained in 40% yield.

Example 5

To a Hoke pressure vessel is charged cyclohexyl phenyl ketone as solvent, 0.17 g. of acetaldhyde initiator and cyclohexene. The sealed vessel is attached to an agitator assembly and immersed in a polyethylene glycol bath maintained at about 200° C. When thermal equilibrium is reached, oxygen is introduced to a total pressure of about 300 p.s.i.g. Oxidation is allowed to preceed for ten minutes, then the oxygen is shut off and the vessel is immersed in a cold water bath. Analyses indicate a 45% conversion of cyclohexene to oxygenated products, among which cyclohexene oxide is obtained in 30% yield.

Example 6

To a Hoke pressure vessel is charged benzophenone, 0.16 g. of acetaldehyde and propylene. The sealed vessel is attached to an agitator assembly and immersed in a polyethylene glycol bath maintained at about 200° C. When thermal equilibrium is reached, oxygen is introduced to a total pressure of about 300 p.s.i.g. Oxygenation is allowed to proceed for 10 minutes, then the oxygen is shut off and the vessel is immersed in a cold water bath. Analyses indicate a 30% conversion of propylene to oxygenated products, among which propylene oxide is obtained in 35% yield.

Example 7

To a Hoke pressure vessel is charged dinaphthyl ketone, 0.17 g. of acetaldehyde and propylene. The sealed vessel is attached to an agitator assembly and immersed in a polyethylene glycol bath maintained at about 200° C. When thermal equilibrium is reached, oxygen is introduced to a total pressure of about 300 p.s.i.g. Oxygenation is allowed to proceed for 10 minutes, and the oxygen is shut off and the vessel is immersed in a cold water bath. Analyses indicate a 29% conversion of propylene to oxygenated products, among which propylene oxide is obtained in 38% yield.

Example 8

To a modified Hoke pressure vessel is charged dicyclopropyl ketone as solvent, and butadiene. The sealed vessel is attached to an agitator assembly and immersed in a polyethylene glycol bath maintained at about 150° C. When thermal equilibrium is reached, oxygen is introduced to a total pressure of about 200 p.s.i.g., and the oxidation is allowed to proceed for five minutes. The oxygen is shut off and the vessel is immersed in a cold water bath. Analyses indicate a 45% conversion of butadiene to oxygenated products, among which butadiene dioxide is obtained in a small yield and butadiene monoxide is obtained in 25% yield.

Example 9

To a Hoke pressure vessel is charged dicyclohexyl ketone as solvent, acetaldehyde initiator, and vinylcyclohexene. The sealed vessel is attached to an agitator assembly and immersed in a polyethylene glycol bath maintained at about 200° C. When thermal equilibrium is reached oxygen is introduced to a total pressure of about 300 p.s.i.g. and the oxidation is allowed to proceed for fifteen minutes. The oxygen is shut off and the vesel is immersed in a cold water bath. Analyses indicate 25% yield of vinylcyclohexene oxide; a 50% conversion of vinylcyclohexene to oxygenated products occurs.

Example 10

To a Hoke pressure vessel is charged cyclobutyl phenyl ketone solvent and styrene. The sealed vessel is attached to an agitator assembly and immersed in a polyethylene glycol bath maintained at about 180° C. When thermal equilibrium is reached, oxygen is introduced to a total pressure of about 200 p.s.i.g. and the oxidation is allowed to proceed for ten minutes. The oxygen is shut off and the vessel is immersed in a cold water bath. Analyses indicate a 65% conversion of styrene to oxygenated products, among which styrene oxide is obtained in 58% yield.

Example 11

To a Hoke pressure vessel is charged a mixture of equal proportions of acetophenone and n-propyl phenyl ketone as solvent, 0.18 g. of acetaldehyde and ethylene. The sealed vessel is attached to an agitator assembly and immersed in a polyethylene glycol bath maintained at about 200° C. When thermal equilibrium is reached, oxygen is introduced to an overpressure of 200 p.s.i.g. and the oxidation allowed to proceed for 15 minutes. The oxygen is shut off and the vessel immersed in a cold water bath. Analyses indicate 14% conversion of ethylene to oxygenated products, among which ethylene oxide is obtained in 20% yield.

Example 12

In the same apparatus described in the preceding examples, the following run is made: cyclohexyl cyclopropyl ketone is charged to the vessel and the vessel sealed. Ethylene is charged under pressure, the vessel attached to the agitator and connected to the oxygen feed. The vessel is immersed in the 200° bath and allowed to equilibrate, and, when hot, develops an autogenous pressure of 660 p.s.i.g. An overpressure of oxygen is preset, and oxygen is introduced during the first minute of reaction until 1000 p.s.i.g. is reached. After the oxidation has proceeded for 10 minutes, the oxygen feed valve is closed and the vessel immersed in the cold water bath about 10 minutes. With valve closed, the vessel-block valve assembly is removed and gas and liquid contents analyzed by vapor phase chromatographic methods. Analyses of the gas and liquid indicate a 19.0% mole yield of ethylene oxide based on ethylene conversion.

*Example 13*

In the same apparatus described in the preceding examples, the following run is made: 2,2,2-trichloroethyl phenyl ketone solvent containing 10 drops of acetaldehyde is charged to the vessel and the vessel sealed. Propylene is charged under pressure, the vessel attached to the agitator and connected to the oxygen feed. The vessel is immersed in the 200° bath and allowed to equilibrate, and, when hot, develops an autogenous pressure of 320 p.s.i.g. An overpressure of oxygen is preset, and oxygen introduced during the first minute of reaction until about 600 p.s.i.g. is reached. After the oxidation has proceeded for 10 minutes, the oxygen feed valve is closed and the vessel immersed in the cold water bath about 10 minutes. With valve closed, the vessel-block valve assembly is removed and gas and liquid contents analyzed by vapor phase chromatographic methods. Analyses of gas and liquid indicate a 40 mole percent yield of propylene oxide based on a 32% propylene conversion.

*Example 14*

In the same apparatus described in the preceding examples, the following run is made: 2,3-dibromophenyl methyl ketone containing 10 drops of acetaldehyde is charged to the vessel and the vessel sealed. 2-methyl-2-butene is charged under pressure, the vessel attached to the agitator and connected to the oxygen feed. The vessel is then immersed in the 200° bath and allowed to equilibrate, and, when hot, develops an autogenous pressure of about 100 p.s.i.g. An overpressure of oxygen is preset, and oxygen introduced during the first minute of reaction until 300 p.s.i.g. is reached. After the oxidation has proceeded for 11 minutes, the oxygen feed valve is closed and the vessel immersed in the cold water bath about 10 minutes. With valve closed, the vessel-block valve assembly is removed and gas and liquid contents analyzed by vapor phase chromatographic methods. Analyses of the gas and liquid indicate a 60 mole percent yield of 2-methyl-2,3-epoxybutane based on a 41% conversion of 2-methyl-2-butene.

Similarly, comparable results are obtained when mixtures of the described ketones are utilized as solvent in the process, e.g., equal proportions of 2-bromoethyl biphenyl ketone and 1-bromonaphthyl isopropyl ketone.

*Example 15*

This example exemplifies a continuous operation of olefin oxidation according to the present invention. A 300 ml. stirred stainless steel autoclave was employed as the reactor portion of a continuous unit. Three feedlines with necessary controls to meter reactants into the reactor were used to introduce propylene, oxygen and acetophenone solvent into a bottom inlet in the reactor. A product over-flow pipe drained gaseous and liquid product during operation into a separation system from which gas and liquid samples were withdrawn for analyses.

Using acetophenone as solvent, the reactor was heated to 200° C. and propylene was charged to about 15% by weight of the solvent. The three reactants were pumped into the system. Reactor pressure was 51.0 atmospheres. In a typical run the reactants were added at the following hourly rates: propylene, 309 g., oxygen, 137 g., solvent 2000 g. At steady state, (reactor residence time was about 6.7 minutes) propylene conversion was 34.8%, oxygen conversion was 95.1% and propylene oxide yield was 38.2%. A 9.6 mole percent yield of acetic acid was also obtained, along with minor yields of a number of other products.

*Example 16*

The same procedure as described in Example 15 is followed except that benzophenone as solvent is used instead of acetophenone and ethylene is substituted for propylene. Approximate hourly feed rates are: benzophenone solvent, 2000 g., ethylene, 250 g., and oxygen, 120 g. At steady state (reactor residence time about 6 minutes) under 80 atm. pressure and 220° C., ethylene conversion is 47%, oxygen conversion, 99.9% and ethylene oxide yield, 40%.

*Example 17*

In a continuous operation similar to that described in the preceding example, acetophenone solvent, 1,3-butadiene and oxygen are fed to a reactor heated to 150° C. and pressured to 50 atmospheres. At steady state, reactor residence time of about 6 minutes, butadiene conversion is 45%, oxygen conversion, 99.9% and butadiene oxide yield, 28 mole percent.

*Example 18*

The same procedure described in the preceding example is repeated in the continuous production of styrene oxide.

Using benzophenone as solvent, the reactor is heated to 180° C. under 50 atmospheres' pressure, and styrene, a 20% solution in benzophenone, is fed to the reactor. Oxygen is then added slowly and continuously. At steady state, reactor residence time about 6 minutes, styrene conversion is 65%, oxygen conversion, 99.9% and styrene oxide yield, 53 mole percent.

*Example 19*

In a continuous operation similar to that described above, acetonaphthone solvent, 1-phenyl-1-cyclohexene and oxygen are fed to the reactor. The reactor is heated to 200° C. and pressured to 51 atmospheres. At steady state, reactor residence time of about 4 minutes, 1-phenyl-1-cyclohexene conversion is 42%, oxygen conversion 98% and 1-phenyl-cyclohexene oxide is obtained in 30 mole percent yield.

*Example 20*

In a procedure similar to that described in the preceding examples, cyclohexyl phenyl ketone as solvent is fed, together with 4-vinyl-1-cyclohexene and oxygen, to a reactor heated to 200° C. and pressured to 50 atmospheres. At steady state 4-vinyl-1-cyclohexene conversion is 45% (oxygen conversion 98% and 4-vinylcyclohexene oxide yield 30 mole percent.

The following example illustrates an embodiment of the invention wherein a relatively small quantity of a ketone solvent as described herein is employed as solvent in the production of an olefine oxide and as co-products significant quantities of other components useful in commerce which components are derived from propylene oxide. The observed yield of propylene oxide, per se, is relatively low in this example because of in situ transformation to these co-products.

*Example 21*

In a continuous operation employing a 300-ml. stainless steel autoclave, acetophenone, a high-boiler product of a previous propylene oxidation run (boiling point higher than that of acetophenone), acetaldehyde initiator, propylene and oxygen comprise the feed to the reactor. Reactor temperature is 200° C. and the pressure, 50 atmospheres. At steady state, reactor residence time about 4 minutes, the acetophenone content of the liquid phase is 25 weight percent. The propylene conversion is 20.9% and the oxygen conversion 98.3%. Among the products formed, propylene oxide is obtained in about 13 mole percent yield, propylene glycol in about 9 mole percent yield, and the combined yields of propylene glycol mono-formate and propylene glycol mono-acetate (via reaction of formed propylene oxide with formed formic and acetic acids) is about 11 mole percent; thus, the combined yield, based on propylene, of propylene oxide and the simple derivatives thereof, such as propylene glycol and propylene glycol mono-esters, is about 33 mole percent.

The following example illustrates an attempt to prepare an olefin oxide in a liquid reaction medium similar to that in the preceding example, except in this example, the ketone solvent was omitted from the reaction.

*Example 22*

Into a 150-ml. Hoke reaction vessel, described in previous examples, is placed solvent quantities of the high-boiler material described in Example 21. To this material is added 0.12 g. of acetaldehyde initiator and propylene. No ketone solvent was added to the reaction vessel. The reaction vessel is affixed to the agitator yoke of the vibrator apparatus and immersed in a hot polyethylene glycol bath until complete equilibration at 200° C. is reached. The autogenous pressure of the reactor at equilibrium is about 150 p.s.i.g., whereupon oxygen is added to a total pressure of about 350 p.s.i.g., then subsequently oxygen pressure is raised to about 500 p.s.i.g. after 5 minutes. The oxidation is slow, judging by the low exotherm produced, and is allowed to proceed for 10 minutes. At this time the oxygen is turned off and the vessel immersed in the cold water bath. The contents of the reaction vessel, analyzed by vapor phase chromotography, are found to contain no propylene oxide whatsoever, i.e., 0% yield of propylene oxide. Only small quantities of other products, normal co-products of propylene oxidations, are found in this oxidation mixture. Thus, in using this high-boiling polymeric product of propylene oxidation as the solvent for propylene oxidation no propylene oxide is produced in the absence of ketones of this invention and a strong overall inhibition of the oxidation is observed.

The following example illustrates that embodiment of the invention wherein an olefin oxide is prepared by oxidizing an olefin in a liquid reaction medium comprised of a ketone solvent in combination with a hydrocarbon diluent.

*Example 23*

In a continuous operation similar to that described above, acetophenone solvent and benzene as diluent (1:1 mixture by weight), propylene and oxygen are fed to the reactor. The reactor is heated to 200° C. and pressured to 50 atmospheres. At steady state, reactor residence time of about 4 minutes, propylene conversion is 35%, oxygen conversion is 99% and propylene oxide is obtained in 40 mole percent yield.

In like manner, any of the above-mentioned diluents may be combined with the ketone solvents of this invention to provide a liquid phase oxidation medium consisting of no less than 25% by weight based on said medium of said ketone solvent.

Although the foregoing description and specific examples are directed to the preparation of epoxides of olefins by the oxidation of olefins with molecular oxygen in a liquid reaction medium comprising the unique ketone solvents described herein it is within the purview of this invention to utilize this versatile reaction medium to prepare epoxides of other compounds in similar oxidations of other compounds containing epoxidizable olefinically unsaturated linkages such as hydrocarbons, halohydrocarbons, alcohols, ethers, ketones, acids, esters, amides, imides, nitriles and phosphorus esters. Typical ethylenically unsaturated compounds which are contemplated include allyl diphenyl phosphate, dicrotyl phenyl phosphate, allyl chloride, crotyl chloride, mono- and dichlorobutenes, methallyl chloride, o-, m-, and p-chlorostyrene, 3-pentenol-1, 9-octadecenol-1, 2-ethylhexenol-2, cyclopentenol, 3-cyclohexylmethanol, diallyl ether, butyl crotyl ether, 4-pentenyl butyl ether, butyl 3-dodecenyl ether, 1, 4-pentadienyl butyl ether, 3-pentenonitrile, 4-cyanocyclohexene, N-crotylphthalimide, N-allylphthalimide, cinnamic acid, vinylacetic acid, allyl acetate, crotyl acrylate, methyl allyl ketone, methyl 2-pentenyl ketone, ethylene glycol methacrylate, propylene glycol diacrylate and the like.

Polyepoxides of compounds of the above-recited classes of compounds having a plurality of double bonds are also prepared according to the process of the present invention. For example, polymers of diolefins having 4–6 carbon atoms, when used as starting materials yield polydieneepoxides suitable for use in textile finishing.

Variations and modifications of the instant invention will occur to those skilled in the art without departing from the spirit and scope thereof.

What is claimed is:

1. Process for the preparation of olefin oxides which comprises oxidizing olefinically unsaturated compounds containing epoxidizable ethylenic groups and having up to 18 carbon atoms with molecular oxygen in a liquid reaction medium consisting essentially of at least 25% by weight of at least one ketone selected from the group of ketones having the formula $$R-\overset{O}{\underset{\|}{C}}-R^1$$

wherein

R is selected from the group consisting of unsubstituted cycloalkyl and halocycloalkyl groups having from 3 to 6 carbon atoms, unsubstituted monocyclic and polycyclic aryl hydrocarbon and halohydrocarbon groups having from 6 to 12 carbon atoms; and $R^1$ is selected from the group consisting of R radicals and unsubstituted alkyl and haloalkyl groups having from 1 to 18 carbon atoms.

2. Process according to claim 1 wherein said olefinically unsaturated compounds are oxidized at temperatures within the range of from 50° C. to 400° C. and pressures within the range of from 0.5 to 150 atmospheres.

3. Process according to claim 1 wherein the oxidation occurs in the absence of added catalysts.

4. Process for the preparation of propylene oxide which comprises oxidizing propylene with molecular oxygen in a liquid reaction medium consisting essentially of at least 25% by weight of acetophenone.

5. Process according to claim 4 wherein said propylene is oxidized in the absence of added catalysts.

6. Process according to claim 1 wherein said olefinically unsaturated compound is 1,3-butadiene and said olefin oxide is butadiene oxide.

7. Process according to claim 6 wherein said 1,3-butadiene is oxidized in the absence of added catalysts.

8. Process according to claim 1 wherein said olefin is styrene and said olefin oxide is styrene oxide.

9. Process according to claim 8 wherein said styrene is oxidized in the absence of added catalysts.

10. Process according to claim 1 wherein said ketone is benzophenone.

11. Process according to claim 1 wherein said ketone is acetylbiphenyl.

References Cited by the Examiner

UNITED STATES PATENTS

| | | | |
|---|---|---|---|
| 2,475,605 | 7/1949 | Prutton et al. | 260—348.5 |
| 2,784,202 | 3/1957 | Gardner et al. | 260—348.5 |
| 2,833,813 | 5/1958 | Wallace | 260—502 |
| 2,985,668 | 5/1961 | Shingu | 260—348.5 |

FOREIGN PATENTS

| | | |
|---|---|---|
| 917,926 | 2/1963 | Great Britain. |

WALTER A. MODANCE, *Primary Examiner.*

NICHOLAS S. RIZZO, *Examiner.*